June 19, 1934.  J. SHAW ET AL  1,963,562
PROJECTING APPARATUS
Filed Sept. 29, 1931  2 Sheets-Sheet 1
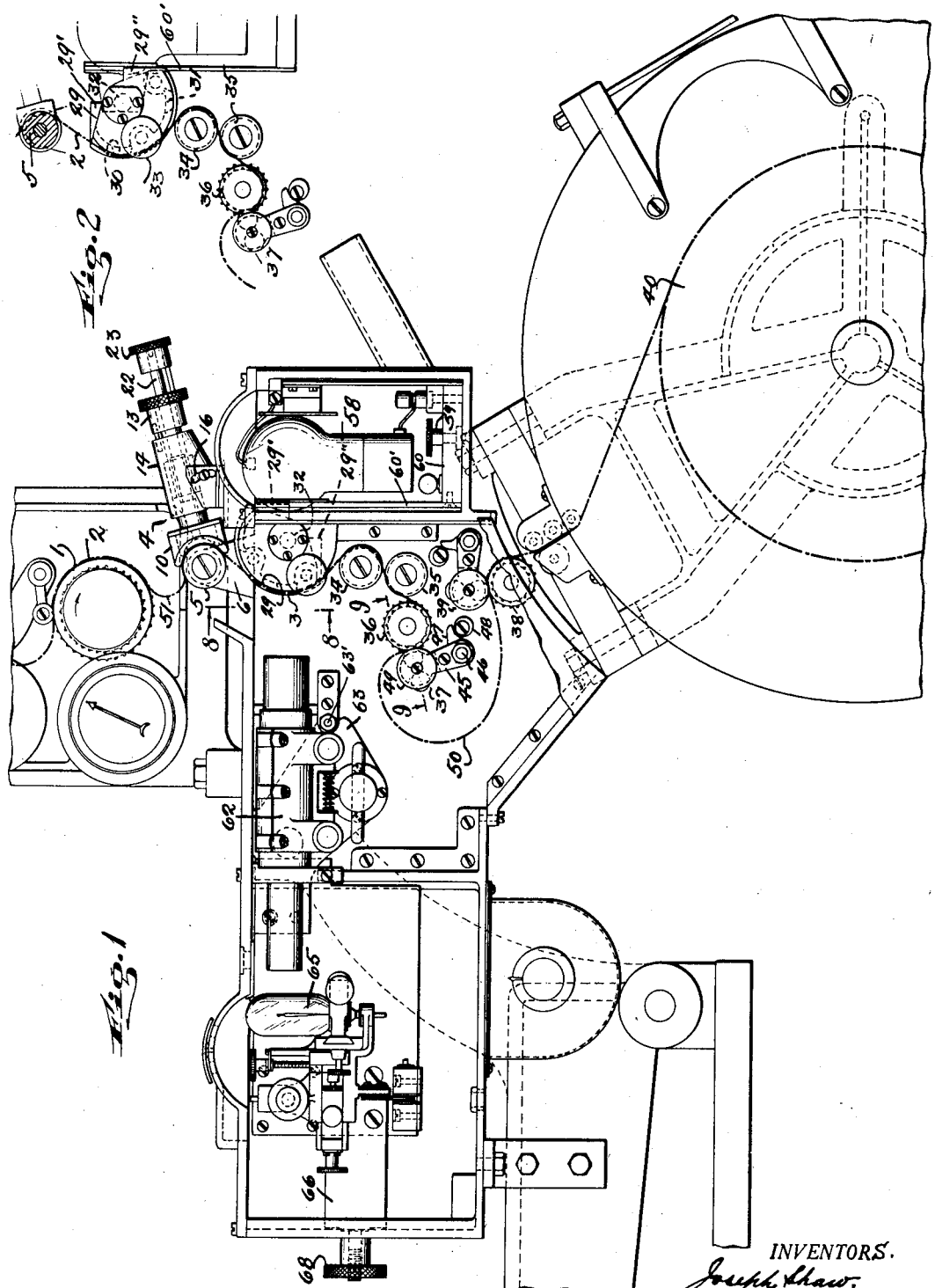
INVENTORS.
Joseph Shaw
Max Ott
BY
Kiddle, Margeson and Hornidge
ATTORNEYS.

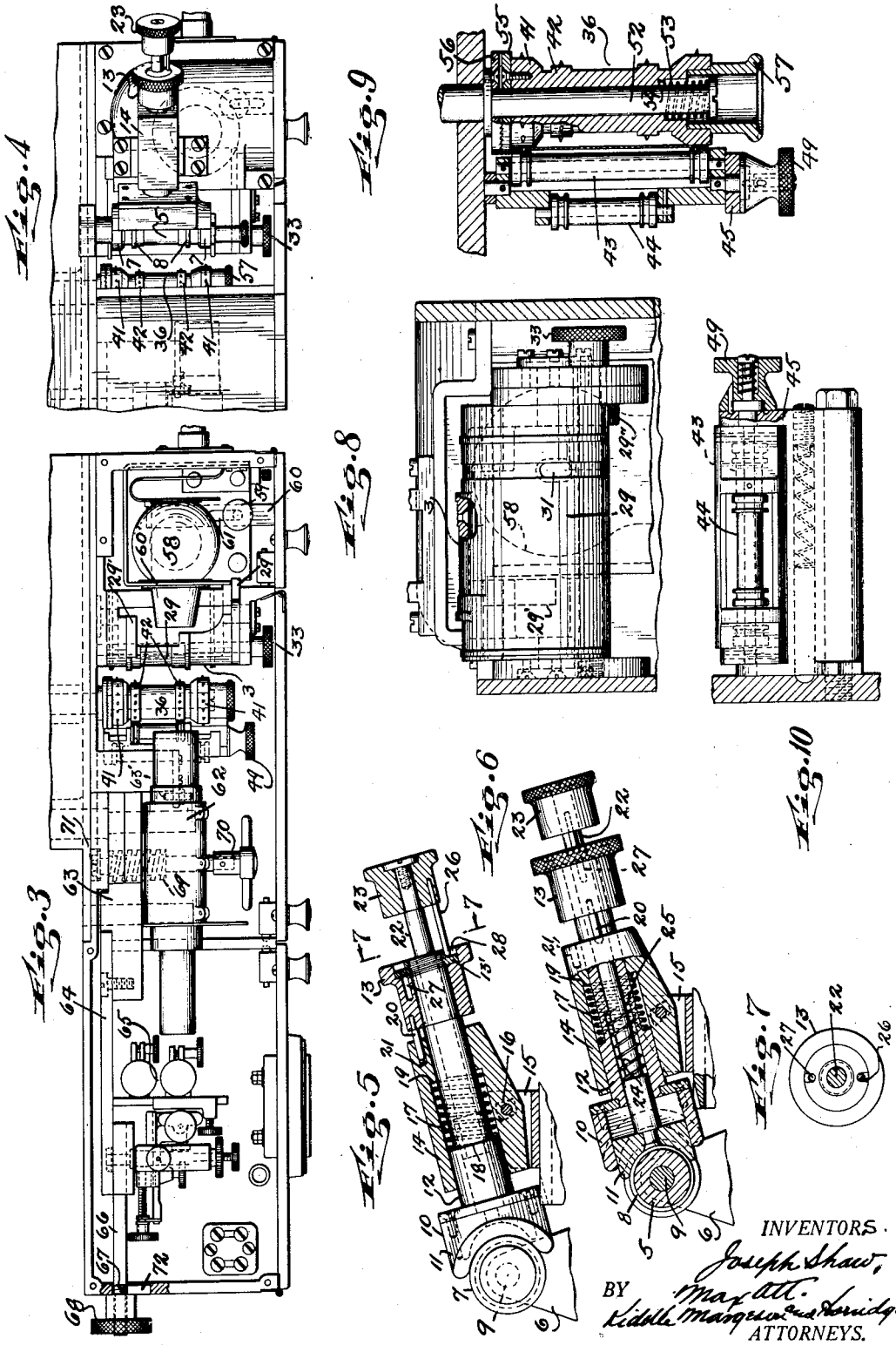

Patented June 19, 1934

1,963,562

UNITED STATES PATENT OFFICE 1,963,562

PROJECTING APPARATUS

Joseph Shaw, Hastings upon Hudson, and Max Ott, New York, N. Y., assignors to Paramount Publix Corporation, New York, N. Y., a corporation of New York Application September 29, 1931, Serial No. 565,748

14 Claims. (Cl. 179—100.3)

This invention relates to an improvement in machines for the projection of sound and provides a construction adapted to accommodate films of standard width as well as films wider than standard.

One of the objects of our invention is the provision of a sound projector of such construction that "fluttering", which in sound projection is brought about by the striations on the sound track as they pass the sound gate aperture not moving at a uniform speed and not being in proper position relatively to the light aperture is eliminated. This misalignment of the sound striations is mainly due to improper delivery of the film to the gate aperture from the delivery sprocket by reason of inaccuracies in the sprocket teeth or the perforations in the film, and vibration of the sprocket. In any event the film may reach the sound gate with the sound striations on the film not parallel to the azimuth of the optical system of the projector with consequent poor reproduction.

The present invention provides for overcoming these defects by introducing a loop in the film between the delivery sprocket and a film roller and cooperating pressure shoe which are introduced into the machine ahead of the gate aperture, this loop taking up any vibrations set up in the film by the delivery sprocket and by providing a pressure shoe for cooperation with the roller to hold the film firmly against the roller the film is held against lateral movement and is delivered to the gate aperture smoothly and in proper alignment with the light aperture in the gate aperture mechanism.

The present invention also provides a construction which when changing from one width film to another permits of shifting the photoelectric cell, the lens system of the sound head and the exciter lamp mechanism so they will always be in alignment as well as in alignment with the light aperture of the sound gate aperture mechanism, this construction being of such a character that little is left to the discretion of an operator in that he merely shifts these mechanisms from one extreme position to the other.

The drawings accompanying this application illustrate an embodiment of our invention.

Fig. 1 is an elevational view of a projector constructed in accordance with our invention;

Fig. 2 is a side elevational view of the gate apertures and associated mechanism;

Fig. 3 is a plan view of the sound head with the parts in position for the projection of standard film;

Fig. 4 is a view similar to Fig. 3 with the parts shifted to wide film position;

Fig. 5 is a sectional elevational view of the so-called gate roller and cooperating pressure shoe;

Fig. 6 is another view of the same apparatus;

Fig. 7 is a section on the line 7—7 of Fig. 5;

Fig. 8 is a section on the line 8—8 of Fig. 1;

Fig. 9 is a section on the line 9—9 of Fig. 1; and

Fig. 10 is another view of the apparatus of Fig. 9.

Referring to the drawings in detail, 1 designates the delivery sprocket of a projector this sprocket delivering the film 2 to the sound gate aperture mechanism designated 3.

Intermediate the delivery sprocket and the sound gate aperture mechanism is a film roller and pressure shoe assembly designated 4. The roller 5 of this assembly is carried on a shaft 9 mounted in a bracket 6 secured to the frame of the machine, the roller being provided on its periphery with two pairs of flanges 7 and 8, the flanges 7, as will be explained hereinafter, accommodating wide film, the flanges 8 accommodating standard width film.

Cooperating with the pressure roller 5 is a pair of pressure shoes 10 and 11, the shoe 10 cooperating with the wide film flanges 7, the shoe 11 with the standard width film flanges 8. The shoe 10 is carried on a hollow shaft 12 provided at its outer end with a knurled knob 13 held thereon by a washer 13' which is screwed directly on the shaft 12. The shaft passes through a housing 14 mounted on a bracket 15 fixed to the frame of the machine. This housing 14 is adjustable on the bracket, the latter being provided with a slot 16 for this purpose. This enables the housing as well as the pressure shoes 10 and 11 to be adjusted as desired about the periphery of the roller 5.

The hollow shaft 12 is equipped with a coil spring 17 one end of which bears against a shoulder 18 provided for that purpose on the shaft, the other end bearing against a shoulder 19 in the housing. The spring as will be observed from Fig. 5 always tends to move the shaft 12 forward, that is, toward the roller 5.

The knob 13, already referred to, is provided with a pin 20 adapted to engage a hole 21 in the housing 14 so that with this pin in register with this hole the shoe 10 may be projected forward by the spring 17 into engagement with a film passing over the flanges 7 on the film roller 5.

The standard film shoe 11 is carried on the inner end of a rod 22 which extends through the hollow shaft 12. The outer end of this rod carries a knob 23. The shaft 22 is shouldered adjacent its inner end and is provided with a coil spring 24 one end of which rests against the shoulder and the other end against the shoulder 25 provided within the hollow shaft 12. The knob 23 is provided with a pin 26 adapted to be moved into registry with a hole 27 in the knob 13 and with a stophole 28 in the face of the same knob. When the pin is in registry with the hole 27 then the rod 22 may be projected forwardly to bring the shoe 11 into engagement with the flanges 8.

When the pin 20 is in registry with the hole 21 in the housing 14 so that the spring 17 will move the shoe 10 forward toward the flanges 7 on the roller 5, as shown in Fig. 5, the shoe 11 cannot be projected forward even though the pin 26 be moved into registry with the hole 27 in the knob 13 because rotation of the knob 13 into position to bring the pin 20 into register with the hole 21 in the housing 14 has moved the knob so that the hole 27 therein is out of register with the hole in the washer 13'.

In changing from the position shown in Fig. 5 to the position shown in Fig. 6 it is necessary to move the shoe 10 rearwardly until the pin 20 is out of the hole 21 in housing 14 at which time the knob 13 which carries the pin 20 will be given a partial turn to maintain the pin out of registry with this hole. This will hold the shoe 10 away from the roller. The face of the housing 14 adjacent the knob 13 may be conveniently provided with a slight depression offset with respect to the hole 21 for receiving the pin 20 as the knob is rotated, as above mentioned, which hole will be so located that the knob will have rotated sufficiently to bring the hole 27 therein into register with the hole in the washer 13'. We now have the pin 20 retracted and out of register with the hole 21 while the hole 27 in the knob 13 and the hole in the washer 13' will be in register and consequently the knob 23 may now be rotated to bring the pin 26 into register with the hole 27 and upon release of the knob while in this position the spring 24 will move the rod 22 and the shoe 11 forward to bring the shoe upon the standard width flanges 8 on the roller 5.

It will be seen, therefore, that we have provided a roller and pressure shoes adapted to cooperate therewith, the shoes 10 accommodating the machine to wide width film, the shoes 11 accommodating the machine to standard width film, means being provided whereby one pair of shoes only can be brought into contact at the one time with the face of the roller.

The sound gate aperture mechanism comprises a curved plate 29 provided with light slits 30 and 31, the plate being pivotally mounted on a post 32 and held in set position on its pivot by a clamp screw 33. A comparison of Figs. 1 and 2 will show that in Fig. 2 the aperture is set to bring the slit 30 into operative position for standard width film, while in Fig. 1 the aperture has been rotated on its pivot clockwise to bring the slit 31 into operative position for wide film. In making the change from the position of Fig. 1 to that of Fig. 2 it is necessary to remove the screw 33, swing the plate around into position and then to insert the screw again.

The film after passing the sound gate aperture mechanism is passed about rollers 34 and 35 and between central feed sprocket 36 and pressure roller mechanism 37, and then between holdback sprocket 38 and pressure roller mechanism 39, and finally to the take-up roller 40. The central feed sprocket 36 comprises two sets of sprockets, one set 41 for wide film, the other set 42 for standard width film. The pressure roller mechanism 37 cooperating with this feed sprocket comprises a roller 43 cooperating with the sprocket 41 for the accommodation of wide film, and a roller 44 cooperating with sprocket 42 for the accommodation of standard width film. These two rollers are mounted in a cage on a forked arm 45 pivoted at 46, this arm being provided with a finger 47 in engagement with a stop 48 which limits the pressure of the rollers on the film. The standard width film sprocket 42 is of smaller diameter than the wide film sprocket 41 so that in changing from wide film to standard width film the arm 45 is swung outwardly away from the central feed sprocket and the knob 49 which is part of the cage in which the rollers 43 and 44 are mounted is rotated to the right, for instance, from the position shown in Fig. 1 to bring the standard width film pressure roller 44 into operative position and to move the wide film pressure roller 43 out of position. The frame is then swung back toward the feed sprocket and operation may be resumed. The same arrangement is provided at the holdback sprocket and pressure rollers 39. In threading the film through the machine a loop designated 50 is left intermediate the central feed sprocket mechanism 36 and the holdback sprocket mechanism 38 as well as the loop 51 intermediate delivery sprocket 1 and pressure roller 5. These loops as well as the position of the film may be adjusted readily by clutch mechanism on the central feed sprocket mechanism 36 as shown in Fig. 9. It will be seen from this figure that the sprockets 41 and 42 which are integral with each other are mounted on a shaft 52 which is provided with a head this shaft carrying a spring 53 bearing against this head and against a shoulder 54 in the bore of the sprocket. Rigid with the end of the sprocket remote from the spring 53 is a clutch plate 55 the face of which is provided with ratchet teeth cooperating with a plate 56 fast on the shaft 52 the face of this plate also being provided with ratchet teeth. Secured to the sprocket is a knob 57. By pulling outwardly on this knob the faces of the clutch plates 55 and 56 are disengaged and the sprocket may be rotated to advance the film.

As pointed out above it is necessary in shifting from one width film to another to move the photoelectric cell, sound gate, lens system and its exciter lamps.

The photoelectric cell 58 and the mounting therefor are movable as a unit transversely of the gate aperture mechanism and to this end a clamp screw 59 passes down through the plate 60 constituting a part of the mount for the photoelectric cell, this plate 60 being slotted as shown at 61. The curved gate aperture member 29 is provided at its rear with extensions 29' and 29" adapted to lie behind one edge or the other of the vertical plate 60' carried by plate 60. When shifting from one width film to another, the aperture plate 29 is swung to midway position, and then by loosening the clamp screw 59 the plate 60 and the photoelectric cell 58 may be moved from the position shown in Fig. 3 to the limit of the slot 61, the aperture plate then being swung to its limit of movement to bring the extension 29' behind the edge of plate 60'. It will be seen therefore that whenever the photoelectric cell is moved the aperture plate must be shifted also. The slot 61 is of such a length that when the photoelectric cell and its mounting are moved they are simply moved to one end or the other of this slot and then clamped by the screw 59, this movement insuring that the photoelectric cell will be in correct position to be in alignment with the slot 30 or the slot 31, as the case may be, in the gate aperture 29.

It is necessary also in changing from one width film to the other to shift the sound head lens system of the machine so as properly to align the same with the slit in the sound gate aperture and with the photoelectric cell as well as with the sound track on the film.

The exciter lamps also must always be in line with the lens system. The lens system which is designated 62 is mounted on a bracket 63 and this bracket is secured to a plate 64 on which is mounted the exciter lamps and their mechanism 65. To this plate 64 is attached another plate 66 provided at its outer end with a threaded member 67 on which is mounted clamp screw 68. The bracket 63 is provided with a threaded rod 69 having a hand wheel 70 attached thereto, this rod passing through the bracket 63 and having its other end attached to the frame of the apparatus in any suitable fashion as indicated at 71. The threaded member 67 passes through a slot 72 in the frame of the machine and it will be apparent that by loosening the clamp screw 68 and turning the hand wheel 70 the lens system and exciter lamp system can be moved as a unit from one extremity to the opposite extremity and by tightening up the clamp screw 68 again will be held in this position. In one position the bracket 63 will strike the stop 63', while in the other position it may strike the frame of the apparatus, for example, so that with the mechanism moved to one limit the exciter lamp and lens systems will be in line with one of the slits in the sound gate aperture and when the mechanism is moved to the other limit the exciter lamp and lens system will be in line with the other slit in the gate aperture.

We have already pointed out that the photoelectric cell 58 is moved from one limit to the other, the slot 61 likewise being of such length that when the cell is moved to one extremity of this slot it will be in position to receive light passing through one of the slits in the gate aperture and when at the other limit of this slot will receive light passing through the other slit in the gate aperture.

It will be seen from the foregoing that we have provided a projection apparatus particularly adapted for the projection of sound in which means are provided whereby fluttering due to vibrations or misalignment of the striations of the film with the slots in the gate aperture is eliminated, any fluttering of the film due to the delivery sprocket 1 being smoothed out by the rollers 5 and pressure shoe mechanism 4.

It will be appreciated also that our apparatus is so constructed and arranged that the photoelectric cell, the slits in the gate aperture, the lens system and the exciter lamp system may all be properly aligned and that care has been exercised to provide such a construction that practically no skill at all is required on the part of the operator to set these various parts in proper alignment.

It will be understood that changes may be made in the details of construction above described within the spirit and scope of our invention.

What we claim is:—

1. In projecting apparatus of the class described the combination of a film delivery sprocket, sound gate aperture mechanism, a smooth film roller intermediate the delivery sprocket and sound gate aperture mechanism for delivering film directly to the gate aperture mechanism, and means cooperating with the roller to introduce a free loop in a film passing from one side of the said sprocket to and over the same side of the said roller on its way to the gate aperture mechanism.

2. In projecting apparatus of the class described the combination of a film delivery sprocket, sound gate aperture mechanism, a smooth film roller intermediate said delivery sprocket and sound gate aperture mechanism for delivering film directly to the gate aperture mechanism, and a pressure shoe for holding a film passing from one side of said sprocket to the same side of the film roller in contact with said roller to introduce a free loop in the film intermediate the delivery sprocket and the roller.

3. In projecting apparatus of the class described the combination of a film delivery sprocket, sound gate aperture mechanism, a smooth film roller intermediate said sprocket and sound gate aperture mechanism and provided with smooth peripheral flanges for the accommodation of films of different widths, pressure shoes cooperating with said flanges to hold the film passing from one side of the film delivery sprocket to the same side of the film roller in contact with the film roller thereby to introduce a free loop in the film intermediate the delivery sprocket and film roller.

4. In projecting apparatus a film roller provided with smooth peripheral flanges for the accommodation of films of different widths, pressure shoes cooperating with said flanges, and means for preventing contact of both sets of shoes with said flanges simultaneously.

5. In projecting apparatus the combination of a film roller provided with peripheral flanges for the accommodation of films of different widths, pressure shoes for cooperation with said flanges, said shoes being mounted concentrically with respect to each other, springs for holding said shoes in contact with said flanges, and stop means for preventing the engagement of one of said shoes with its cooperating flange when the other shoe is in operative position.

6. In projecting apparatus the combination of a film roller provided with peripheral flanges for the accommodation of films of different widths, a bracket adjacent said roller, a pair of pressure shoes adjustably mounted on said bracket, one of said shoes being cooperable with one set of said peripheral flanges, the other shoe being cooperable with the other set of peripheral flanges, a spring for each of said shoes for maintaining the shoes in operative relation to their respective peripheral flanges, and stop mechanism for preventing the functioning of both of said springs simultaneously whereby only one shoe at a time may be brought into operative relation with respect to its cooperating flanges.

7. In projecting apparatus the combination of sound gate aperture mechanism for the accommodation of films of different widths, said gate aperture mechanism being provided with two light transmitting slits, a photoelectric cell behind said sound gate aperture mechanism, a mount or housing for said cell, a pivotal mount for said sound gate aperture mechanism, said sound gate aperture mechanism and the housing for said photoelectric cell being provided with cooperating means to insure alignment of the photoelectric cell with either one of the slits in the said sound gate aperture mechanism.

8. In projecting apparatus the combination of sound gate aperture mechanism provided with two light slits offset with respect to each other, a photoelectric cell adapted to be aligned with either one of said slits, an adjustable mount for said cell to permit said cell to be moved laterally to align the same with either one of said light slits, said sound gate aperture mechanism being provided with means cooperating with the mount for the cell to prevent shifting of the sound gate aperture mechanism without effecting a corresponding change in the position of the photoelectric cell.

9. In projecting apparatus, sound gate aperture mechanism comprising a pivotally mounted curved plate having light transmitting slits therein, a photoelectric cell mounted adjacent said sound gate aperture mechanism, an adjustable mount for said cell, and wings carried by said sound gate aperture mechanism and adapted to engage the mount for the cell, said wings being so arranged with respect to the cell mount that the sound gate aperture mechanism cannot be restored to operative position until the cell has been moved to bring the same in line with one of said slits.

10. In projecting apparatus for projecting films of different widths the combination of sound gate aperture mechanism provided with light transmitting slits, a lens system cooperating with said sound gate aperture mechanism, means for effecting a lateral shifting of said lens system and stop mechanism for limiting such shifting of the lens system, said stop mechanism being so located that the lens system when moved to one stop will be in line with one of the light slits of the sound gate aperture mechanism and when moved to the other stop will be in line with the other light slit of said sound gate aperture mechanism.

11. In projecting apparatus the combination of sound gate aperture mechanism comprising a plate provided with two light slits to accommodate the mechanism to films of different widths, a cooperating adjustably mounted photoelectric cell, means for compelling alignment of the photoelectric cell with either one of the light slits of the sound gate aperture mechanism, a laterally adjustable lens system on the opposite side of the sound gate aperture mechanism from said cell, means for adjusting said lens system laterally and stop means for limiting the adjustment of said lens system in both directions so that when the lens system is moved to one stop it will be in line with one of the light slits of the sound gate aperture mechanism and when moved to the other stop will be in line with the other light slit of the sound gate aperture mechanism.

12. Projecting apparatus comprising in combination sound gate aperture mechanism provided with a plurality of light slits for accommodating the aperture mechanism to films of different widths, a lens system cooperating with said sound gate aperture mechanism, a lamp system connected to said lens system, means for effecting adjustment laterally as a unit of the lens system and the lamp system, and stop mechanism for limiting this adjustment in both directions so that movement of the lens system and lamp system to one stop will maintain the lamp system and lens system in alignment with each other and in alignment with one of the light slits of the sound gate aperture mechanism and movement to the other stop will, while maintaining the lamp system and lens system in alignment, bring the same in alignment with the other slit of the sound gate aperture mechanism.

13. In projecting apparatus the combination of an exciter lamp system, a lens system in alignment therewith, a photoelectric cell, sound gate aperture mechanism intermediate the photoelectric cell and said lens system and provided with light slits for accommodating the apparatus to films of different widths, adjustable mounts for said exciter lamp system and lens system and photoelectric cell, and means for maintaining on one adjustment the exciter lamp system, the lens system, one of the slits of the sound gate aperture mechanism and the photoelectric cell in line and on the other adjustment maintaining the exciter lamp system, the lens system, the other slit of the sound gate aperture mechanism and said photoelectric cell in line.

14. In projecting apparatus the combination of a film delivery sprocket, sound gate aperture mechanism, a smooth roller and cooperating shoe intermediate the holdback sprocket and sound gate aperture mechanism to maintain a loop in the film passing from said sprocket and over said roller to the gate aperture mechanism, a holdback sprocket mechanism, a central feed sprocket mechanism, said holdback and central feed sprockets providing for maintaining a free loop in the film as it is being projected, and clutch mechanism connected with said central feed sprocket mechanism for the manual adjustment of the said loops and of the position of the film to be projected.

JOSEPH SHAW.
MAX OTT.